US012729732B2

(12) United States Patent
Hahn et al.

(10) Patent No.: US 12,729,732 B2
(45) Date of Patent: Sep. 8, 2026

(54) PISTON FOR A DISK BRAKE, DISK BRAKE HAVING AT LEAST ONE PISTON, AND SERIES OF PISTONS

(71) Applicant: Erdrich Umformtechnik GmbH, Renchen-Ulm (DE)

(72) Inventors: Thomas Hahn, Weissensee (DE); Rico Bauersfeld, Kannawurf (DE); Uwe Zeibig, Achern (DE)

(73) Assignee: Erdrich Umformtechnik GmbH, Renchen-Ulm (DE)

( * ) Notice: Subject to any disclaimer, the term of this patent is extended or adjusted under 35 U.S.C. 154(b) by 0 days.

(21) Appl. No.: 18/579,956

(22) PCT Filed: Dec. 16, 2022

(86) PCT No.: PCT/EP2022/086388
§ 371 (c)(1),
(2) Date: Jan. 17, 2024

(87) PCT Pub. No.: WO2023/160861
PCT Pub. Date: Aug. 31, 2023

(65) Prior Publication Data

US 2026/0117831 A1 Apr. 30, 2026

(30) Foreign Application Priority Data

Feb. 24, 2022 (DE) ..................... 10 2022 104 388.6

(51) Int. Cl.

| | |
|---|---|
| ***F16D 65/18*** | (2006.01) |
| *F16D 121/04* | (2012.01) |
| *F16D 125/06* | (2012.01) |

(52) U.S. Cl.
CPC .......... *F16D 65/18* (2013.01); *F16D 2121/04* (2013.01); *F16D 2125/06* (2013.01)

(58) Field of Classification Search
CPC ............. F16D 2125/40; F16D 2125/06; F16D 2121/04
See application file for complete search history.

(56) References Cited

U.S. PATENT DOCUMENTS

| | | | | |
|---|---|---|---|---|
| 10,364,890 | B2 * | 7/2019 | Winkler | F16J 1/001 |
| 10,570,973 | B2 * | 2/2020 | Leidecker | F16D 65/18 |
| 2011/0132188 | A1 | 6/2011 | Winkler et al. | |
| 2011/0315007 | A1 | 12/2011 | Koch et al. | |

FOREIGN PATENT DOCUMENTS

| | | | | |
|---|---|---|---|---|
| DE | 102007051456 A1 | 4/2009 | | |
| DE | 102009017167 A1 | 12/2009 | | |
| DE | 102018120764 B3 | 12/2019 | | |
| DE | 102021103509 A1 | 8/2022 | | |
| DE | 102021128309 A1 * | 5/2023 | | F16D 65/18 |
| WO | 2015074905 A1 | 5/2015 | | |

* cited by examiner

*Primary Examiner* — Abiy Teka
(74) *Attorney, Agent, or Firm* — Volpe Koenig

(57) ABSTRACT

A piston (1) for a disk brake is proposed, with the piston having an outer part (4) and an inner part (5) inserted into the outer part (4), wherein a cavity (8) is formed between the outer part (4) and the inner part (5), which cavity is closed in a fluid-tight manner by at least one fluid-tight connection (9, 10) between the inner part (5) and the outer part (4) to prevent ingress of hydraulic fluid.

24 Claims, 4 Drawing Sheets

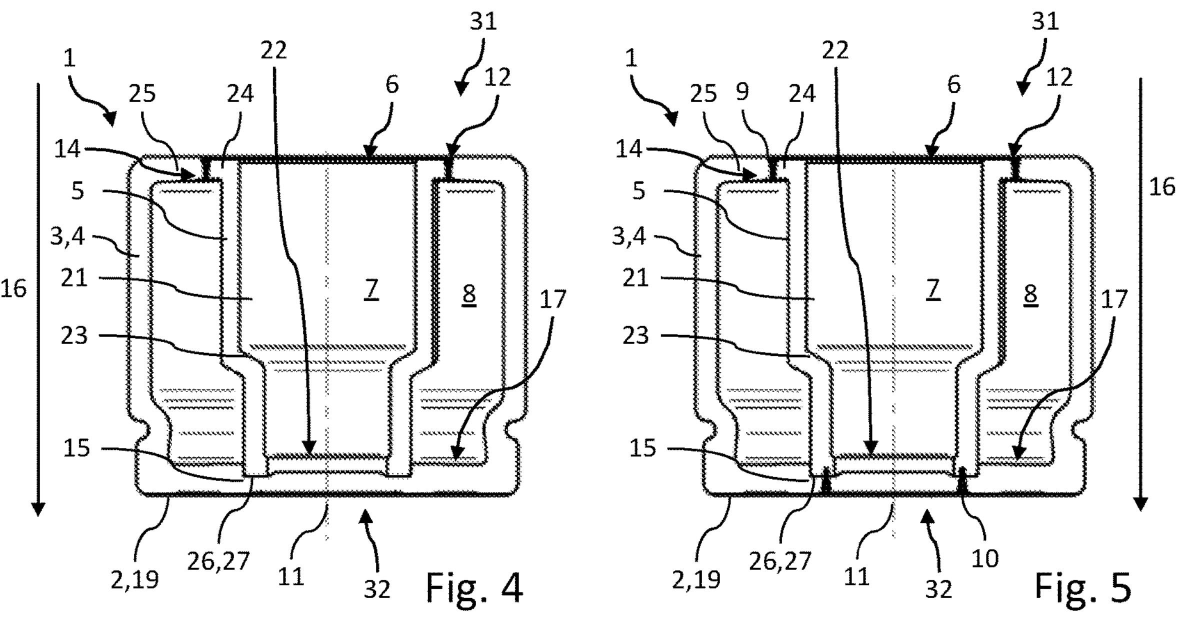
Fig. 4
Fig. 5
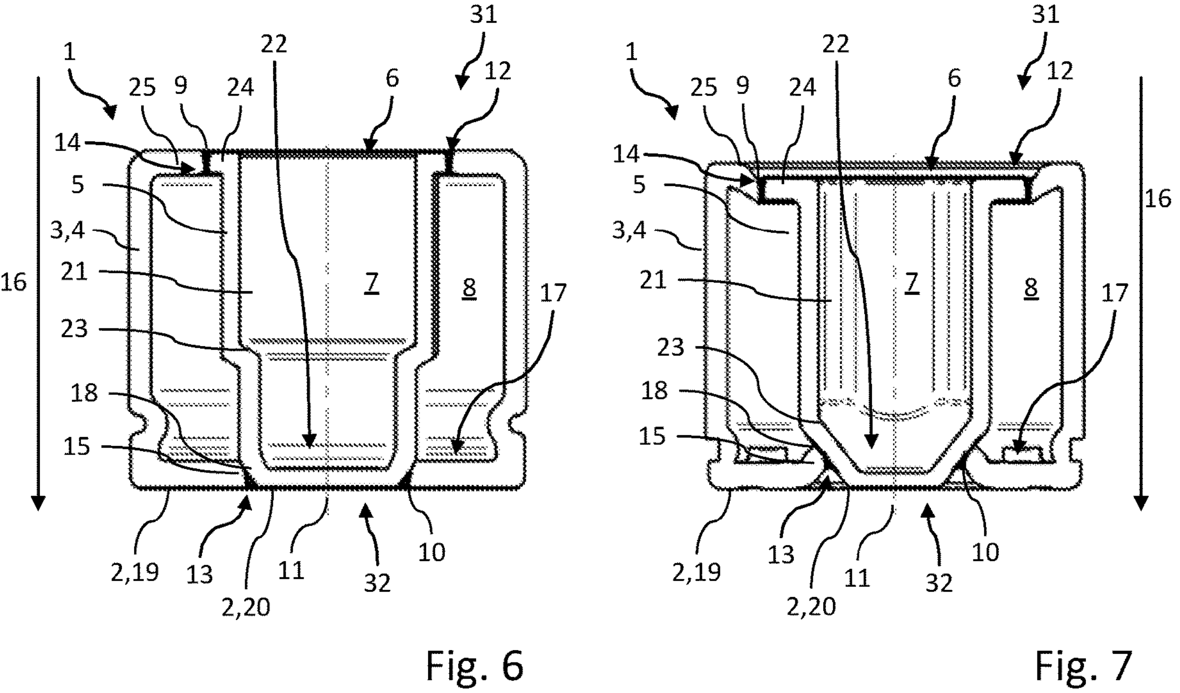
Fig. 6
Fig. 7

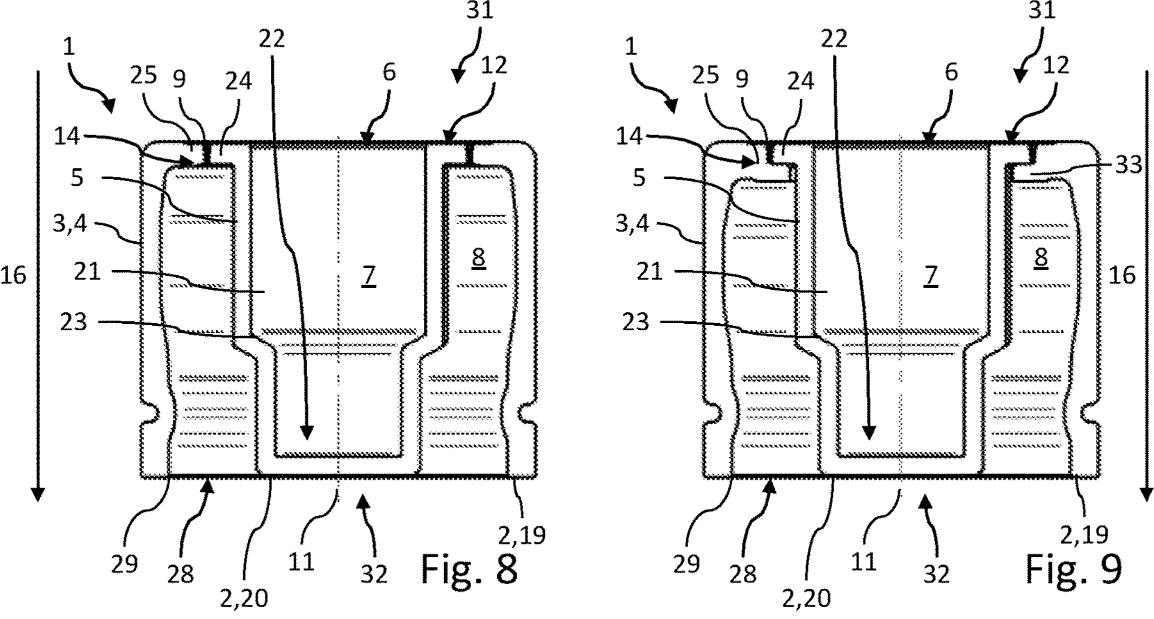
Fig. 8
Fig. 9
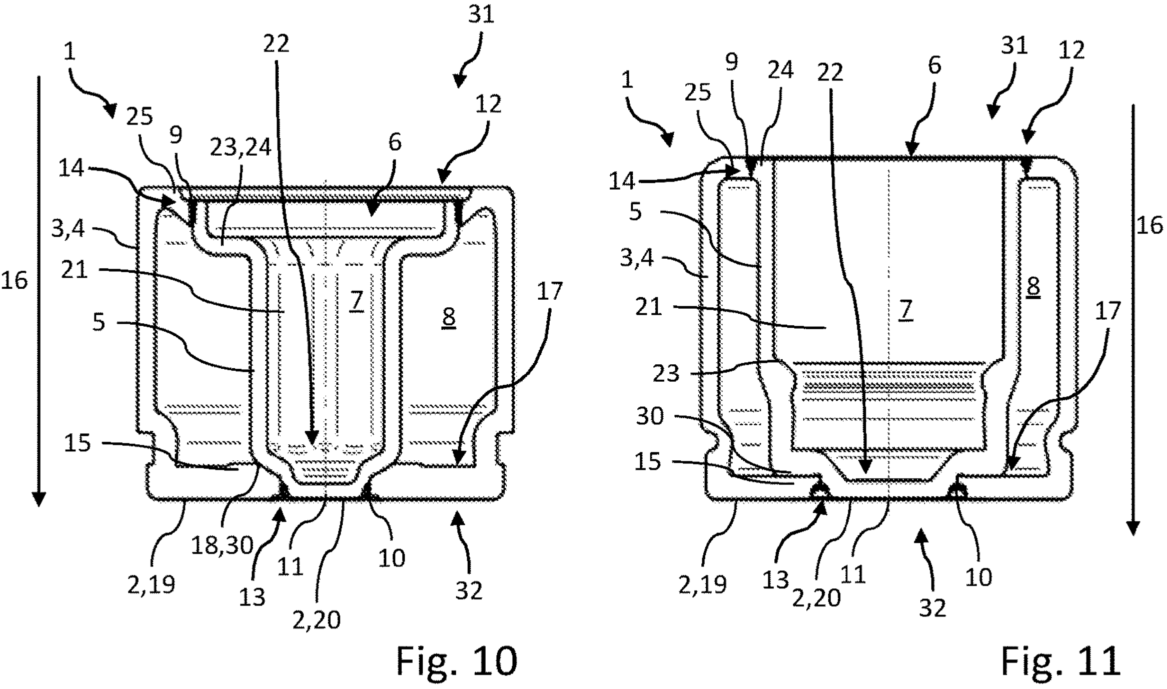
Fig. 10
Fig. 11

PISTON FOR A DISK BRAKE, DISK BRAKE HAVING AT LEAST ONE PISTON, AND SERIES OF PISTONS

CROSS-REFERENCE TO RELATED APPLICATIONS

This application is a 371 National Phase of PCT/EP2022/086388, filed Dec. 16, 2022, which claims priority to German Patent Application No. 10 2022 104 388.6, filed Feb. 24, 2022, both of which are incorporated herein by reference as if fully set forth.

TECHNICAL FIELD

The invention relates to pistons for disk brakes having a contact surface for a brake lining, having an outer part forming a piston skirt and an inner part inserted into the outer part, wherein the inner part has an opening on its side facing away from the contact surface and, in its interior, a receptacle via which the piston can be pressurized with a hydraulic fluid and/or by an actuating means of a parking brake drive.

Such pistons are used to press a brake pad of a disk brake against a brake disk of the disk brake. This can take place selectively by pressurizing the piston with hydraulic fluid or by pressurizing the piston with an actuating means of a parking brake drive.

Furthermore, the invention also relates to a disk brake having at least a such piston as well as a series comprising at least two types such pistons.

BACKGROUND

The design of the pistons can influence the service properties of the disk brakes equipped with them and can also be decisive for economical production of the pistons.

The design of the pistons can influence the response behavior of disk brakes equipped with them. The lightest possible piston can be advantageous for the response behavior of the disk brake. However, it must be ensured here that the pistons are stable enough so that they can withstand the possibly high pressures and associated loads permanently.

The design of the pistons, for example, can also be decisive for easy bleeding of the disk brakes. A disk brake that is as well bled as possible is desirable in terms of a defined pressure point that can be felt by a user when using the disk brake.

SUMMARY

The object of the invention is therefore to provide a piston of the type mentioned at the beginning with improved service properties, which can also be manufactured economically.

For the solution of this object, first a piston with the features of the first independent claims directed towards such a piston is proposed. In particular, in order to solve the object, a piston for a disk brake having a contact surface for a brake lining, having an outer part forming a piston skirt and an inner part inserted into the outer part is proposed, wherein the inner part has an opening on its side remote from the contact surface and, in its interior, a receptacle via which the piston can be pressurized with a hydraulic fluid and/or by an actuating means of a parking brake drive, and wherein a cavity is formed between the outer part and the inner part, which cavity is closed in fluid-tight manner by at least a fluid-tight connection between the inner part and the outer part against ingress of hydraulic fluid from the receptacle of the inner part into the cavity.

In this manner a piston with a comparatively large effective outer diameter, which is determined by its outer part, can be provided, wherein the piston can be operated with a comparatively small amount of hydraulic fluid due to its inner part with a smaller outer dimension in comparison with the outer diameter of the outer part. The fluid-tight connection between the inner part and the outer part effectively prevents hydraulic fluid reaching the cavity between the inner part and the outer part from the receptacle of the inner part. The reduced amount of hydraulic fluid can simplify the bleeding of the disk brake equipped with the piston. In addition, the use of an outer part and an inner part located in the outer part enables the lightweight design of the piston. This can improve the dynamics of the piston during operation of the disk brake. Reducing the amount of hydraulic fluid in a disk brake equipped with the piston according to the invention may have a positive effect on the braking function and response of the disk brake. The greater the amount of hydraulic fluid in the brake system, the smoother the disk brake may feel to a user when braking. In addition to saving weight by reducing the amount of hydraulic fluid in the braking system, disk brake parts upstream of the piston, such as a caliper, can also be made less rigid and thus less expensive. The use of less material in the manufacture of the parts upstream of the piston can also result in further weight savings. The piston according to the invention thus makes it possible to provide disk brakes with improved braking function, which are also lighter and can be offered at a lower price than previous disk brakes.

Due to the at least two-part structure of the piston comprising the inner part and the outer part, the material expense in manufacturing the piston is reduced, even if the piston has a comparatively large outer dimension. In this way a comparatively more favorable and, moreover also in relation to its dimensions, lighter piston is provided.

It is provided in an embodiment of the piston that the cavity is sealed in a fluid-tight manner by two connections between the inner part and the outer part against ingress of hydraulic fluid into the cavity from the receptacle of the inner part, which connections are axially spaced from each other with respect to a longitudinal axis of the piston.

Such a piston can have a particularly simple structure. The outer part can have the shape of a sleeve, which surrounds the inner part. As a result of two fluid-tight connections between the inner part and the outer part, the inner part and the outer part can be connected with each other and furthermore the cavity formed between the inner part and the outer part can be sealed in a fluid-tight manner, in particular be sealed. In this context, the two fluid-tight connections between the inner part and the outer part can be attached or manufactured from different axial sides of the piston. This enables the easy manufacture of the piston and in particular the fluid-tight connections. Further, the use of two fluid-tight connections may also favor the provision of a further series of pistons, which is explained below in even more detail and comprises at least two different types of pistons.

To solve the object, a piston with the features of the second independent claim directed to such a piston is also proposed. Thus, in particular for solving the problem in a piston of the type mentioned at the beginning, it is proposed that the outer part has a retaining opening for the inner part axially spaced with respect to a longitudinal axis of the piston from an insertion opening for the inner part, in which retaining opening the inner part is arranged for support on the outer part. The retaining opening of the outer part for the inner part, which is provided at an axial distance from the insertion opening, makes it possible to transmit a compressive force from the inner part particularly reliably and effectively to the outer part and/or to a contact surface of the piston for a brake lining of a disk brake equipped with the piston. The retaining opening can pass through a bottom of the outer part.

This type of support of the inner part on the outer part has advantages, particularly in connection with the increasing lightweight requirements to which such pistons are also subject. The support of the inner part on the outer part via the retaining opening of the outer part enables a rigid design of the piston even with comparatively low material usage. This favors the use properties of the piston according to the invention.

In one embodiment of the piston, it is provided that the piston has the features of the two independent claims, each directed to a piston for a disk brake, combined with one another.

In one embodiment of the invention, it is provided that the at least one fluid-tight connection is a materially bonded connection, for example a welded connection. It is particularly preferred, because it can be produced quickly and efficiently, if the at least one fluid-tight connection is a laser welded connection.

The at least one fluid-tight connection can surround the longitudinal axis of the piston in an annular, in particular circular, closed manner. This ensures that the connection is fluid-tight.

In one embodiment of the piston, it is provided that the insertion opening of the outer part for the inner part is closed in a fluid-tight manner by a, in particular first, fluid-tight connection.

A, in particular first, fluid-tight connection may be formed between an edge of the outer part bounding the insertion opening of the outer part for the inner part and the inner part. In one embodiment of the piston, this connection may be formed between a brim of the inner part and the outer part. The brim may surround the opening of the inner part and/or form a largest diameter of the inner part.

Preferably, the inner part is formed as a fluid-tight pot. Such a fluid-tight pot may have a fluid-tight inner wall. In this way, leakage of fluid through the inner wall of the inner part into the cavity formed between the inner part and the outer part is effectively prevented. The receptacle of the inner part can be formed without undercuts. By designing the receptacle without undercuts, it is possible to prevent air bubbles from becoming trapped inside the receptacle and making it more difficult to bleed the disk brake equipped with the piston.

The outer part can have a support section on which the retaining opening for the inner part is formed and via which the inner part is supported on the outer part in the feed direction of the piston. In particular, the support section can be arranged or formed on a bottom of the outer part. The support section may be formed by reshaping the outer part, in particular by reshaping its bottom section.

In one embodiment, it is provided that the support section, starting from the contact surface of the piston, spans an acute angle with the longitudinal axis of the piston and/or with the contact surface of the piston. The acute angle may be in each case an angle between 30° and 60°, inclusive, and preferably an angle of 45°. In particular, if the support section is aligned at an angle of 45° to the longitudinal axis and/or to the contact surface of the piston, a particularly efficient transmission of force between the inner part and the outer part is possible. The support section allows force to be redirected from the inner part to the outer part in steps, which in turn favors force transmission between the inner part and outer part.

A, in particular a second, fluid-tight connection can close the aforementioned retaining opening in a fluid-tight manner and/or be formed between the support section of the outer part and the inner part.

The retaining opening of the outer part can be arranged axially with respect to a longitudinal axis of the piston between the contact surface of the piston and the insertion opening of the outer part. In this case, the retaining opening can be formed in a bottom of the outer part.

The insertion opening of the outer part can have a larger diameter than its retaining opening for the inner part.

The inner part can have a conically tapering section with which the inner part is supported on the outer part. The inner part may be disposed with the tapered section in the retaining opening of the outer part and supported on the outer part. The conically tapering section of the inner part may be an end section of the inner part formed at an end of the inner part opposite the opening of the inner part. The conical section may be frustoconical and may have an axial surface of the inner part at its end, which may form at least part of the contact surface of the piston. The retaining opening of the outer part may have an inner diameter that is smaller than an outer dimension of the inner part in a section upstream of the conical section. The conical section makes it particularly easy to position the inner part centered in the preferably circular retaining opening of the outer part. The fact that the inner part has a larger diameter in the section upstream of the conical section means that the inner part can be brought into its proper position relative to the outer part particularly easily and accurately. This favors economical production of the piston.

The contact surface of the piston can be formed at least partially on the outer part and/or at least partially on the inner part. Overall, the contact surface of the piston for a brake lining can thus be distributed over the outer part and the inner part. In this context, it is advantageous if an axial end face of the outer part and an axial end face of the inner part lie in a common plane and/or together form the contact surface of the piston.

The inner part can have a guide section in its receptacle for an actuating means of a parking brake drive. The inner part can have an anti-rotation device, for example in the form of a non-circular inner cross section of the guide section, for an actuating means of a parking brake drive.

The inner part can have a hydraulically effective loading surface in its receptacle. The hydraulically effective loading surface can be arranged axially with respect to a longitudinal axis of the piston between the stop surface of the piston for a brake lining and the aforementioned retaining opening of the outer part for the inner part.

The inner part can have a stop surface for an actuating means of a parking brake drive. In this case, the stop surface can be arranged with respect to a longitudinal axis of the piston between the contact surface of the piston for a brake lining and the insertion opening of the outer part and/or the opening of the inner part.

The aforementioned, hydraulically effective loading surface can be arranged axially with respect to a longitudinal axis of the piston between the aforementioned stop surface for an actuating means of a parking brake drive and the contact surface of the piston for a brake lining.

In one embodiment of the piston, at least one fluid-tight connection between the inner part and the outer part is a fluid-tight connection formed on an end face of the piston. In a preferred embodiment of the piston, the piston has a fluid-tight connection between the inner part and the outer part on each of two end faces facing away from each other. Fluid-tight connections on the end faces are favorable from a production engineering point of view. The arrangement of the connections on the end faces can simplify the formation of the fluid-tight connections, in particular by a welding process, for example laser welding.

In one embodiment of the piston, it is provided that the outer part has a closed collar which extends around a longitudinal axis of the piston. The collar can delimit the insertion opening of the outer part for the inner part and/or be oriented radially inwards in the direction of the longitudinal axis of the piston or the outer part. In this case, a fluid-tight connection between the inner part and the outer part may be arranged or formed between the collar and the inner part. Even in the case of a piston whose outer part has such a collar, it is possible to create the fluid-tight connection between the collar and the inner part on the end face.

In an embodiment of the piston whose outer part comprises a collar, the collar may further comprise a step. The inner part may rest against the step, in particular with a brim that the inner part may have and that may surround the aforementioned opening of the inner part. Such a step on a collar of the outer part can simplify the positioning of the inner part in or on the outer part, and ultimately also promote the formation of a fluid-tight connection between the outer part and the inner part that is created at the front end.

The outer part may include a bottom in one embodiment of the piston. The bottom may be the portion of the outer part oriented transversely or perpendicularly to the longitudinal axis of the outer part and/or oriented transversely or perpendicularly to the longitudinal axis of the piston and/or disposed at an end of the outer part remote from the insertion opening of the outer part. In one embodiment of the piston, the bottom may be of closed design. The inner part of the piston may then be arranged at or on this bottom. In particular in this context, the inner part may be of sleeve-shaped design and have no bottom of its own.

In one embodiment of the piston, it is provided that a recess, for example a groove, preferably a closed circumferential annular groove, is formed in the, preferably closed, bottom of the outer part. The inner part can then be arranged in this recess, in particular in this groove or annular groove. In this context in particular, it is possible for the inner part to be formed in the shape of a sleeve and not to have a bottom itself. The recess formed in the bottom of the outer part, in particular the groove or annular groove, can be helpful for reliably and easily positioning the inner part in the outer part and for forming a fluid-tight connection between the outer part and the inner part.

In a preferred embodiment of the piston, a fluid-tight connection between the outer part and the inner part is a welded connection created by a bottom of the outer part, in particular a closed bottom. The welded connection may be, for example, a laser-welded connection. Such a welded connection between the outer part and the inner part, produced by the bottom of the outer part, can be easily produced in a particularly efficient manner, even in series production, and is therefore advantageous for economical production of the piston.

In one embodiment of the piston, the outer part can have a front opening on its end face facing away from the insertion opening. The front opening may be formed in the bottom of the outer part and/or have an edge which is spaced from the inner part. In this way, the inner part then sits inside the front opening of the outer part without contacting the outer part. The front opening, which may be formed in addition to the insertion opening on the outer part, allows the outer part to have a particularly low weight.

In one embodiment of the piston, the inner part can have a shoulder on its outer side. Particularly preferably, the shoulder can be designed as a retaining shoulder. With the shoulder, the inner part can contact the outer part. For example, it is thus possible for the inner part to be arranged with its shoulder in a retaining opening, for example in the previously mentioned retaining opening, in particular in the bottom, of the outer part. In this way, the inner part can be positioned and centered comparatively easily and precisely in the outer part due to the shoulder. This can favor the creation of a fluid-tight connection, in particular on the end face, between the outer part and the inner part in the region of the retaining opening of the outer part.

In one embodiment of the piston, it is provided that the inner part has a section facing away from the opening into the receptacle of the inner part, the diameter of which section, in particular its outer diameter, is smaller than a diameter, in particular than an outer diameter, of a section of the inner part adjacent to the opening of the inner part. In this way, the inner part can have a stepped cross-section. The stepped cross-section may allow the aforementioned shoulder to be formed on the outside of the inner part.

It is further an object of the invention to provide a series of such pistons which enables rational production of such pistons.

Finally, the invention also relates to a series of pistons for disk brakes having at least two types of pistons according to one of the claims directed to a piston, wherein the at least two types of pistons have identical inner parts, in particular inner parts which are identical to each other with respect to their receptacles, and different outer parts, in particular outer parts with different outer diameters. In this way, it is possible, for the production of pistons with different outer parts, in particular for the production of pistons with different outer diameters, to vary only the outer parts and to use inner parts which are identical at least with respect to the volume of their receptacles. In this case, the inner parts can be identical to each other, in particular with regard to the inner contour of their respective receptacles. All types of pistons can then have only one type of inner part, at least with regard to the receptacle of the inner part. This can simplify the production of the series of pistons by reducing the variety of parts.

In addition, the accommodation of the inner part can help determine the volume of hydraulic fluid in the braking system equipped with the piston. In order to optimize the braking performance of the braking system, it is desirable to minimize the volume of hydraulic fluid in the braking system. The inner parts of the at least two types of pistons, which correspond with respect to their receptacles, and the at least one fluid-tight connection between the outer part and the inner part in the case of the pistons of the series ensure that the amount of hydraulic fluid in the piston is independent of the outer diameter of the outer part of the piston, which defines the outer diameter of the piston. The amount of hydraulic fluid in the different pistons of the series is then defined by the receptacles of the inner parts and their volume. Since the receptacles of the inner parts of the different types of pistons of the series are preferably identical at least with respect to their volume, the pistons of the series then contain the same amount of hydraulic fluid regardless of their piston diameters.

In one embodiment of the series of pistons, it is provided that the outer parts of the different types of pistons have retaining openings with identical inner diameters for inner parts, even if they differ in terms of their outer diameters. In this way, the outer parts of the different types of pistons are designed identically with respect to their retaining openings, so that they are suitable for receiving the inner parts which are identical for all types of pistons.

BRIEF DESCRIPTION OF THE DRAWINGS

The invention is described in more detail below with reference to exemplary embodiments, but is not limited to these exemplary embodiments. Further exemplary embodiments result from combining the features of individual or several claims for protection with each other and/or in combination of individual or several features of the exemplary embodiments, wherein:

FIG. 4 shows a sectional view of a further piston prior to the creation of two fluid-tight connections axially spaced from one another with respect to a longitudinal axis of the piston, the outer part of which has a closed bottom with a recess, namely with a closed circumferential groove, in which the sleeve-shaped inner part of the piston, which has no bottom or an open bottom, is arranged, wherein the outer part further has an inwardly directed collar which delimits the insertion opening of the outer part for the inner part, FIG. 5 shows a sectional view of the piston shown in FIG. 4 after the two fluid-tight connections between the outer part and the inner part have been created, wherein the lower of the two connections is a face laser welded connection created by a closed bottom of the outer part, FIG. 6 shows a sectional view of a further piston, the outer part of which has a retaining opening for the inner part in its bottom, which is of flat design, wherein two fluid-tight laser welded connections are formed between the outer part and inner part, which are spaced apart axially with respect to a longitudinal axis of the piston and are produced on the end face, by means of which the cavity between the outer part and inner part is sealed in a fluid-tight manner, FIG. 7 shows a sectional view of a further piston similar in construction to the piston of FIG. 1, wherein, in this piston, the outer part has an angled bottom through which a retaining opening for the inner part passes, and a first fluid-tight connection is formed between a brim of the inner part and an inwardly directed collar of the outer part and a second fluid-tight connection is formed in the retaining opening of the outer part for the inner part between the outer part and the inner part, FIG. 8 shows a sectional view of another piston having an open-faced outer part without a bottom and a stepped inner part disposed therein, and a single end face fluid-tight laser weld connection disposed between a collar of the outer part and a brim of the inner part, by which the cavity between the outer part and the inner part is sealed from a hydraulic side of the piston, FIG. 9 shows a sectional view of a further piston whose structure is similar to the structure of the piston shown in FIG. 8, wherein this piston has on its outer part a collar with a step against which the inner part rests with its brim, FIG. 10 shows a sectional view of a further piston having an inner part which has a retaining section containing the opening of the inner part and widened in relation to a downstream section of the inner part, and having an outer part which has a retaining opening for the inner part, wherein two fluid-tight connections are formed between the inner part and the outer part, by means of which the cavity between the outer part and the inner part is sealed in a fluid-tight manner, and FIG. 11 shows a sectional view of a further piston which has an inner part with a retaining shoulder on its outer side, via which the inner part is supported in a retaining opening of the outer part on the outer part.

DETAILED DESCRIPTION

Figure 1:
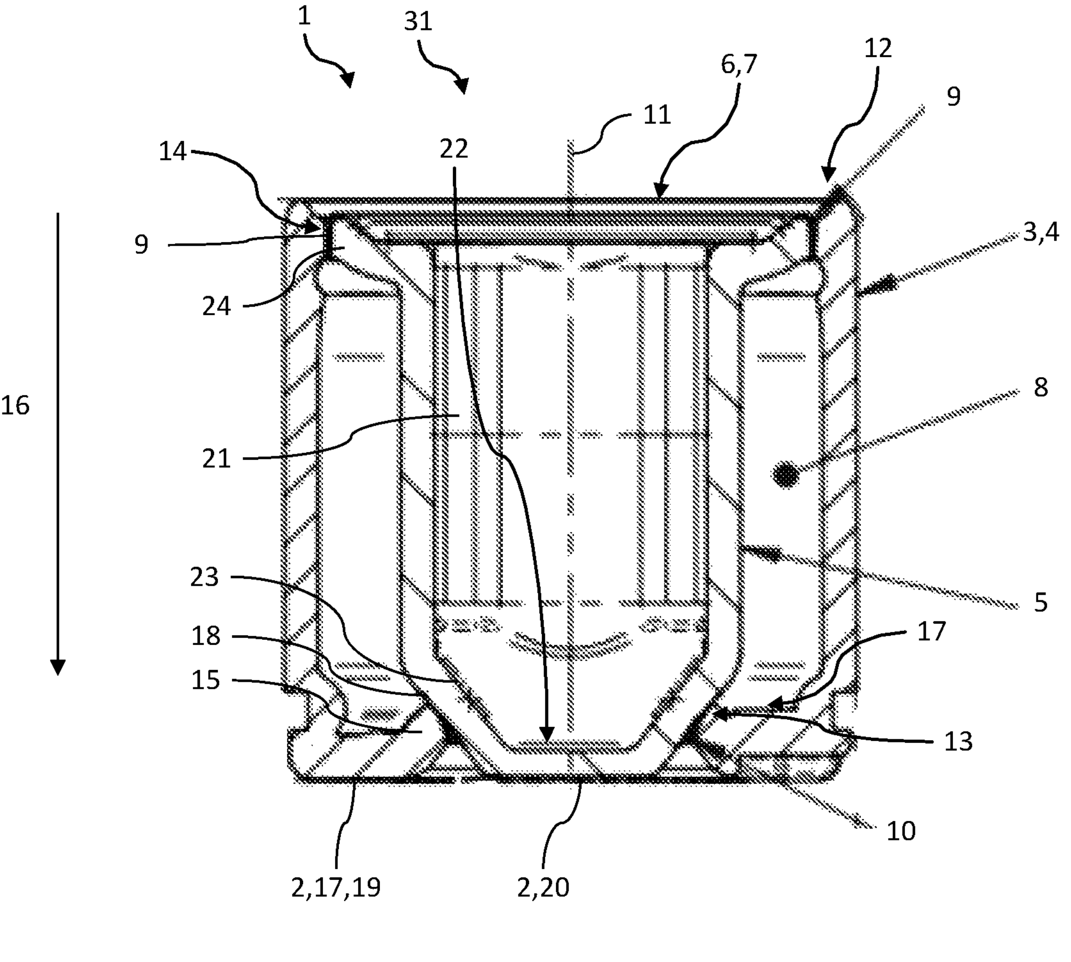
FIG. 1 shows a sectional side view of a piston having an inner part inserted into an outer part, with the outer part and the inner part being connected to one another by two fluid-tight connections spaced apart from one another with respect to a longitudinal axis of the piston in such a way that a cavity arranged between the inner part and the outer part is closed in a fluid-tight manner.

All figures show a piston for a disk brake, designated in its entirety as 1.

In the following description of different exemplary embodiments of the pistons 1, parts of the pistons which correspond with regard to their function are given corresponding reference signs even if their design differs. Where not separately indicated, the following explanations refer to all exemplary embodiments shown in the figures.

Each of the pistons 1 has a contact surface 2 axially aligned with respect to its longitudinal axis 11, by means of which a brake lining can be pressed against a brake disk of a disk brake.

Each of the pistons 1 comprises an outer part 4 forming a piston skirt 3 and an inner part 5 inserted into the outer part 4.

The inner part 5 has an opening 6 on its side facing away from the contact surface 2 of the piston 1 and a receptacle 7 in its interior, via which the piston 1 can be pressurized with a hydraulic fluid and/or with an actuating means of a parking brake drive in order to advance the piston 1 in a feed direction 16.

A cavity 8 is formed between the outer part 4 and inner part 5. The cavity 8, in particular of the piston 1 according to FIGS. 1 to 3, 5 to 7 and 10 and 11, is sealed in a fluid-tight manner by two fluid-tight connections 9 and 10 between the inner part 5 and the outer part 4 to prevent hydraulic fluid from entering the cavity 8 from the receptacle 7 of the inner part 5. The two fluid-tight connections 9 and 10 are axially spaced apart with respect to the longitudinal axis 11 of the piston 1. The cavity 8 is formed between the two connections 9 and 10.

In the pistons 1 of FIGS. 1 to 3, 6 and 7 and 10 and 11, the outer part 4 has a retaining opening 13 for the inner part 5, which is axially spaced apart with respect to the longitudinal axis 11 of the piston 1 from an insertion opening 12 for the inner part 5. In the retaining opening 13, the inner part 5 is arranged to be supported on the outer part 4. In all pistons 1 shown in the figures, which have a retaining opening 13, the retaining opening 13 passes through a bottom 17 of the respective outer part 4.

Figure 2:
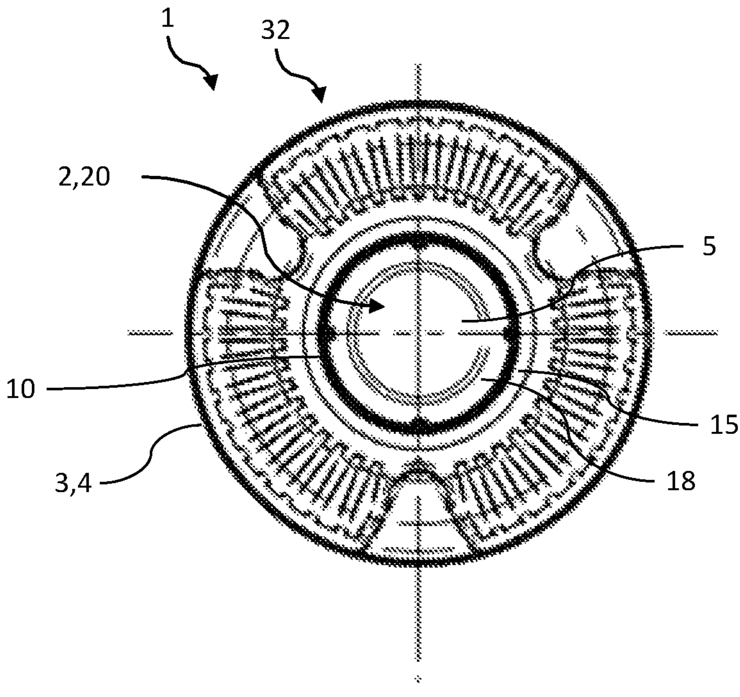
FIG. 2 shows a bottom view of the piston shown in FIG. 1.
Figure 3:
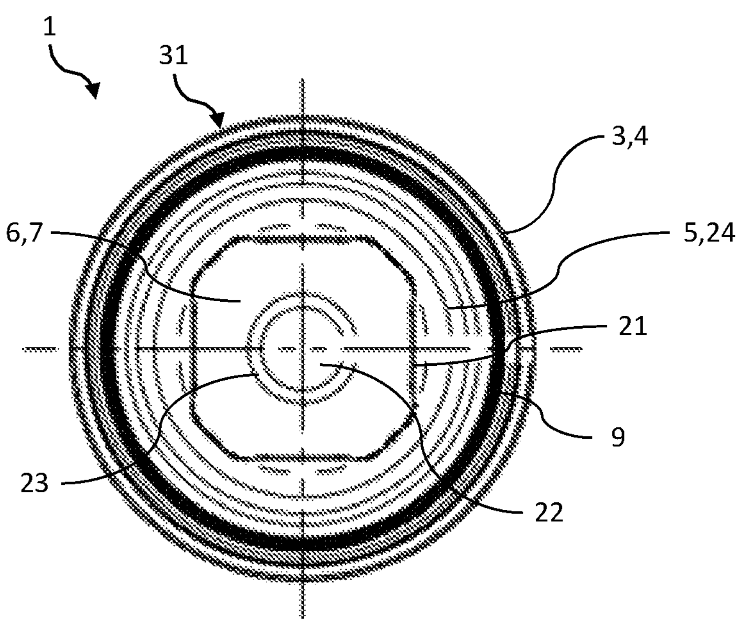
FIG. 3 shows a top view of the piston shown in FIGS. 1 and 2.

The two fluid-tight connections 9 and 10 are in each case materially bonded connections, namely laser-welded welded connections. The two connections 9 and 10 each surround the longitudinal axis 11 of the respective piston 1 in an annular manner, namely in a circular ring shape, as illustrated in FIGS. 2 and 3.

The insertion opening 12 of the outer part 4 for the inner part 5 is closed in a fluid-tight manner by a first fluid-tight connection 9 of the two fluid-tight connections 9 and 10 between the outer part 4 and the inner part 5.

The first fluid-tight connection 9 is formed in this case between an edge 14 of the outer part 4 bounding the insertion opening 12 of the outer part 4 and the inner part 5. The pistons 1 according to FIGS. 8 and 9 have only a single fluid-tight connection 9 between the outer part 4 and the inner part 5.

The inner part 5 is formed as a fluid-tight pot, as illustrated in particular by the sectional view of the piston 1 of FIG. 1. In the pistons 1 of FIGS. 6 to 11, the inner part 5 is also designed as a fluid-tight pot. The receptacle 7 of the inner part 5 of all pistons 1 is also designed without undercuts. This prevents air bubbles from becoming trapped inside the receptacle 7 and making it more difficult to bleed the disk brake equipped with the piston 1.

The outer part 4 of the pistons 1 of FIGS. 1 to 3, 6 and 7 and 10 and 11 has a support section 15 on which the retaining opening 13 for the inner part 5 is formed and via which the inner part 15 is supported on the outer part 4 in the feed direction 16 of the piston 1.

According to the sectional views in FIGS. 1, 7 and 10, the support section 15 of the outer part 4 spans in each case an acute angle with the longitudinal axis 11 and also with the contact surface 2 of the piston 1 on the other side. The support section 15 spans an angle of 45° with the contact surface 2 and the longitudinal axis 11 of the piston 1 in each case. According to the sectional views from FIGS. 6 and 11, the support section 15 of the outer part 4 spans a right angle with the longitudinal axis 11 of the piston 1.

The second fluid-tight connection 10 of the two fluid-tight connections 9 and 10, which is provided in individual pistons 1, closes the retaining opening 13 of the outer part 4 in a fluid-tight manner. In this case, the second fluid-tight connection 10 is formed between the support section 15 of the outer part 4 and the inner part 5.

The retaining opening 13 of the outer part 4 is formed axially with respect to the longitudinal axis 11 of the piston 1 between the contact surface 2 of the piston 1 and the insertion opening 12 of the outer part 4 in a bottom 17 of the outer part 4.

The insertion opening 12 of the outer part 4 has a larger diameter than the retaining opening 13 of the outer part 4 for the inner part 5 in all pistons 1 that have a retaining opening 13. The inner part 5 has a section 18 conically tapering towards its closed end. With the conical section 18, the inner part 5 is supported on the outer part 4. The inner part 5 is positioned with its conical section 18 in the retaining opening 13 of the outer part 4.

The contact surface 2 of the piston 1 is formed in one part on the outer part 4 and in another part on the inner part 5. For this purpose, an axial end face 19 of the outer part 4 and an axial end face 20 of the inner part 5 are arranged in a common plane, namely in a common axial plane of the piston 1, and together form the contact surface 2 of the piston 1.

The inner part 5, in particular of the pistons 1 shown in FIGS. 1 to 10, has a brim 24 which surrounds the opening 6 on the outside and between which and the outer part 4 the first fluid-tight connection 9 is formed.

According to FIG. 1, the inner part 5 has in its receptacle 7 a guide section 21 for an actuating means of a parking brake drive. The guide section 21 has a non-circular inner cross-section to prevent the actuating means from rotating. The inner parts 4 of the other pistons 1 also have a guide section 21 in their receptacles 7 for an actuating means of a parking brake drive.

In its receptacle 7, the inner part 5 of the pistons 1 of FIGS. 1 to 3 and 6 to 11 also has a hydraulically effective loading surface 22 and a stop surface 23 for an actuating means of a parking brake drive. In the case of the piston 1 shown in FIGS. 1 to 3, the stop surface 23 for the actuating means of a parking brake drive is arranged in continuation of the support section 15 of the outer part 4. The stop surface 23 is formed on an inner side of the conical section 18 of the inner part 5. This favors direct force transmission of the actuating means of a parking brake drive via the inner part to the support section 15 of the outer part 4. In the position of use, the piston 1 shown in the figures is part of a disk brake not shown.

In the exemplary embodiment of the piston 1 shown in FIGS. 4 and 5, the outer part 4 has a circumferential collar 25 which encloses the insertion opening 12 of the outer part 4 for the inner part 5.

The inner part 5 of the piston 1 shown in FIG. 4 is sleeve-shaped and without a bottom, and has a brim 24 at its end adjacent to the collar 25 of the outer part 4. Between the brim 24 and the collar 25, as shown in FIG. 5, a fluid-tight connection 9 is formed on the end face between the outer part 4 and the inner part 5 in the form of a laser-welded connection. This fluid-tight connection 9 provides a fluid-tight seal of the cavity 8 between the outer part 4 and the inner part 5 with respect to a hydraulically loaded side of the piston 1.

The outer part 4 of the piston 1 shown in FIG. 4 has a closed bottom 17. In the closed bottom 17, a recess 26 is formed in the form of a groove 27, namely an annular groove. The inner part 5 is arranged in this groove 27.

FIG. 5 shows the piston 1 of FIG. 4 with a second fluid-tight connection 10 created in addition to the first fluid-tight connection 9 on the end face between outer part 4 and inner part 5. This second fluid-tight connection 10 is formed between outer part 4 and inner part 5 at an axial distance from the first fluid-tight connection 9 with respect to a longitudinal axis 11 of the piston 1. FIG. 5 shows that this wide fluid-tight connection 10 is formed as a welded connection, namely as a laser-welded connection, which was created by the closed bottom 17 of the outer part 4. This variant of the piston 1 is characterized by its particularly simple manufacturability, even in series production. The recess 26 in the form of the groove 27 in the bottom 17 of the outer part 4 of this piston 1 favors the precise positioning of the inner part 5 in the outer part 4 and thus also the formation of the second fluid-tight connection 10 created at the end face by the closed bottom 17 of the outer part 4.

FIG. 6 shows an embodiment of the piston 1 in which the outer part 4 has a collar 25 and, at its end facing away from the collar 25, a retaining opening 13. According to FIG. 6, the retaining opening 13 is formed in a flat, non-angled bottom 17 of the outer part 4. The inner part 25, which is stepped in cross-section, has a brim 24 surrounding the opening 6 of the inner part 5. Furthermore, the end of the inner part 5 facing away from the brim 24 is arranged in the retaining opening 13 of the outer part 4 and is supported on the outer part 4 via the latter.

Between the collar 25 of the outer part 4 and the brim 24 of the inner part 5, a first fluid-tight connection 9 in the form of a laser welded connection is introduced at the end face. A second fluid-tight connection 10 between the outer part 4 and the inner part 5 is formed inside the retaining opening 13 in the bottom 17 of the outer part 4 on the end face between the outer part 4 and the inner part 5.

FIG. 7 shows a further embodiment of a piston 1, the structure of which corresponds to the structure of the piston 1 shown in FIG. 1. In this piston 1, too, the outer part 4 has a bottom 17 which is angled and is penetrated by a retaining opening 13 for the inner part 5. However, in the piston 1 shown in FIG. 7, the inner part 5 has a brim 24 and the outer part 4 has a collar 25. Also in this piston 1, one of the two fluid-tight connections 9 and 10 is formed between the brim 24 on the inner part 5 and the collar 25 on the outer part 4.

The pistons 1 shown in FIGS. 1 to 3, 4 to 7 and 10 and 11 each have a fluid-tight connection 9 or 10 between the outer part 4 and the inner part 5 on two mutually remote end faces 31 and 32 of the respective piston 1.

The two pistons 1 shown in FIGS. 8 and 9 each have an outer part 4 which has a front opening 28 on its end face 32 facing away from the insertion opening 12 for the inner part 5. FIGS. 8 and 9 show that the respective edge 29 of the front opening 28 is at a distance from the inner part 5 of the respective piston 1. At the end of the outer part 4 facing away from the insertion opening 12, there is thus no connection between the outer part 4 and the inner part 5. It should be mentioned at this point that the inner part 5 of the pistons 1 shown in FIGS. 8 and 9 can also be inserted into the respective outer part 4 through the front openings 28 if required.

The outer part 4 of the piston 1 shown in FIG. 9 also has a step 33 on its collar 25, against which the inner part 5 rests with its brim 24.

FIGS. 1, 7, 10 and 11 show that the inner parts 5 of the pistons 1 reproduced in these figures each have a shoulder 30 on their outer side. The respective shoulder 30 functions as a retaining shoulder with which the inner part 5 contacts the outer part 4 and, in this case, in particular a bottom 17 of the respective outer part 4. In the exemplary embodiment of the piston 1 shown in FIGS. 1, 7, 10 and 11 respectively, it can be clearly seen that the inner parts 5 are centered in the retaining openings 13 of the respective outer part 4 via their shoulders 30. This favors the formation of the respective second fluid-tight welded connection, in particular laser-welded connection, produced on the end face between the inner part 4 and the stay 5.

The design of the pistons 1 shown in FIGS. 1-11 permits the provision of a series comprising at least two different types of such pistons 1. The two types of pistons 1 have identical inner parts 5 and differ from one another in their outer parts 4. The outer parts 4 have different outer diameters. Thus, it is possible to provide a series of several types of pistons 1 which have different outer diameters, but without also having to use different inner parts 5 for this purpose.

The outer parts 4 of the different types of pistons 1 have retaining openings 13 with identical inner diameters for the inner parts 5.

The invention relates to improvements in the technical field of disk brakes. For this purpose, among other things, a piston 1 for a disk brake is proposed which comprises an outer part 4 and an inner part 5 inserted into the outer part 4, wherein a cavity 8 is formed between the outer part 4 and the inner part 5, which cavity is closed in a fluid-tight manner against the ingress of hydraulic fluid by at least one fluid-tight connection 9, 10 between the inner part 5 and the outer part 4.

LIST OF REFERENCE SIGNS

1 Piston
2 Contact surface
3 Piston skirt
4 Outer part
5 Inner part
6 Opening
7 Receptacle in 5
8 Cavity between 4 and 5
9 First liquid tight connection
10 Second fluid-tight connection
11 Longitudinal axis from 1
12 Insertion opening
13 Retaining opening
14 Edge around 12
15 Support section
16 Feed direction
17 Bottom of 4
18 Conical section of 5
19 Axial end face of 4
20 Axial end face of 5
21 Guide section of 5
22 Loading surface of 5
23 Stop surface of 5
24 Brim on 5
25 Collar on 4
26 Recess in 17
27 Groove in 17
28 Front opening of 4
29 Edge of 28
30 Shoulder on 5
31 End face of 1—hydraulic side
32 End face of 1
33 Step on 25

The invention claimed is:

1. A piston for a disk brake, the piston comprising:
a contact surface for a brake lining, an outer part forming a piston skirt and an inner part inserted into the outer part;
the inner part has an opening on a side thereof facing away from the contact surface and, in an interior thereof, a receptacle via which the piston is pressurizable by at least one of a hydraulic fluid or by an actuating means of a parking brake drive;
a cavity formed between the outer part and the inner part, the cavity is closed fluid-tight by at least one fluid-tight connection between the inner part and the outer part to prevent ingress of hydraulic fluid from the receptacle of the inner part into the cavity, wherein the cavity is closed fluid-tight against ingress of hydraulic fluid from the receptacle of the inner part into the cavity by two of the fluid-tight connections between the inner part and the outer part, which are axially spaced apart from each other with respect to a longitudinal axis of the piston.

2. The piston according to claim 1, wherein the outer part has a retaining opening for the inner part axially spaced with respect to a longitudinal axis of the piston from an insertion opening for the inner part, and the inner part is arranged in the retaining opening for support on the outer part.

3. The piston according to claim 2, wherein an insertion opening of the outer part for the inner part is closed fluid-tight by a first of the at least one fluid-tight connection between the outer part and the inner part.

4. The piston according to claim 3, wherein the first, fluid-tight connection is formed between an edge of the outer part bounding the insertion opening of the outer part and the inner part.

5. The piston according to claim 3, wherein the outer part has a support section on which the retaining opening for the inner part is formed and via which the inner part is supported on the outer part in a feed direction of the piston.

6. The piston according to claim 5, wherein the support section, starting from the contact surface of the piston, spans an acute angle with at least one of a longitudinal axis or the contact surface of the piston.

7. A piston for a disk brake, the piston comprising:

a contact surface for a brake lining, an outer part forming a piston skirt and an inner part inserted into the outer part;

the inner part has an opening on a side thereof facing away from the contact surface and, in an interior thereof, a receptacle via which the piston is pressurizable by at least one of a hydraulic fluid or by an actuating means of a parking brake drive;

a cavity formed between the outer part and the inner part, the cavity is closed fluid-tight by at least one fluid-tight connection between the inner part and the outer part to prevent ingress of hydraulic fluid from the receptacle of the inner part into the cavity wherein the outer part has a retaining opening for the inner part axially spaced with respect to a longitudinal axis of the piston from an insertion opening for the inner part, and the inner part is arranged in the retaining opening for support on the outer part;

an insertion opening of the outer part for the inner part is closed fluid-tight by a first of the at least one fluid-tight connection between the outer part and the inner part;

the outer part has a support section on which the retaining opening for the inner part is formed and via which the inner part is supported on the outer part in a feed direction of the piston; and a second of the at least one fluid-tight connection at least one of closes the retaining opening fluid-tight or is formed between the support section of the outer part and the inner part.

8. The piston according to claim 7, wherein the retaining opening of the outer part is formed axially with respect to a longitudinal axis of the piston between the contact surface of the piston and the insertion opening of the outer part.

9. The piston according to claim 8, wherein the insertion opening of the outer part has a larger diameter than the retaining opening for the inner part.

10. The piston according to claim 2, wherein the inner part has a section tapering conically in a direction of the contact surface, with which the inner part is supported on the outer part.

11. The piston according to claim 1, wherein the at least one fluid-tight connection is at least one of a materially bonded connection or surrounds a longitudinal axis of the piston in an annular closed manner.

12. The piston according to claim 1, wherein at least one of a) the inner part comprises a fluid-tight pot, or b) the receptacle of the inner part is designed without undercuts.

13. The piston according to claim 1, wherein the contact surface of the piston is at least one of a) formed at least partially on the outer part, b) formed at least partially on the inner part, or c) an axial end surface of the outer part and an axial end surface of the inner part lie in a common plane and together form the contact surface of the piston.

14. The piston according to claim 1, wherein at least one of a) the inner part has in the receptacle a guide section for an actuating means of a parking brake drive, or b) the inner part has in the receptacle at least one of a hydraulically effective loading surface or a stop surface for an actuating means of a parking brake drive.

15. The piston according to claim 1, wherein the at least one fluid-tight connection between the inner part and the outer part is a fluid-tight connection formed on an end face of the piston.

16. The piston according to claim 1, wherein the outer part has a closed collar which extends around a longitudinal axis of the piston and delimits an insertion opening for the inner part into the outer part, and the at least one fluid-tight connection between the inner part and the outer part is arranged between the collar and the inner part.

17. The piston according to claim 16, wherein the collar has a step against which the inner part rests.

18. The piston according to claim 17, wherein the outer part has a bottom at or on which the inner part is arranged, and a recess is formed in the bottom in which the inner part is arranged.

19. The piston according to claim 1, wherein, wherein the at least one fluid-tight connection between the outer part and the inner part is a welded connection, produced by a bottom of the outer part.

20. The piston according to claim 1, wherein the outer part has, on an end face thereof facing away from an insertion opening for the inner part into the outer part, a front opening, an edge of which is spaced from the inner part.

21. The piston according to claim 1, wherein the inner part has a shoulder on an outer side thereof with which the inner part contacts the outer part.

22. A disk brake having at least one of the pistons according to claim 1.

23. A series comprising at least two types of the pistons according to claim 1, wherein the at least two types of pistons have identical ones of the inner parts which are identical with respect to a volume of their receptacles, and the outer parts thereof have different outer diameters.

24. The series according to claim 23, wherein the outer parts of the different types of pistons have retaining openings with identical inner diameters for the inner parts.

* * * * *